Nov. 22, 1927.
M. PIERCE
LIFTING JACK
Filed Jan. 15, 1927
1,650,536
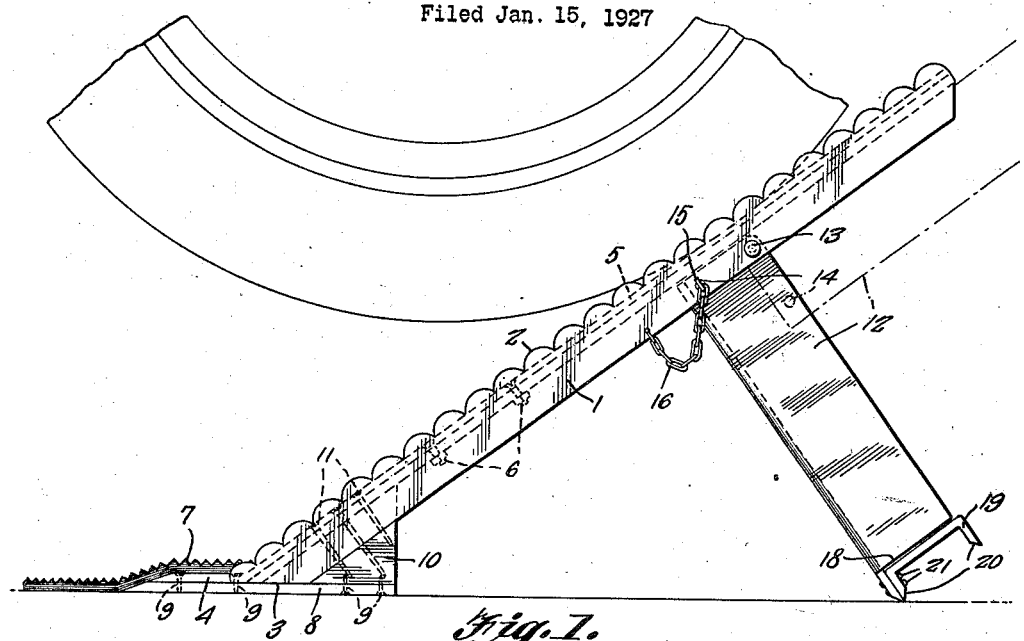
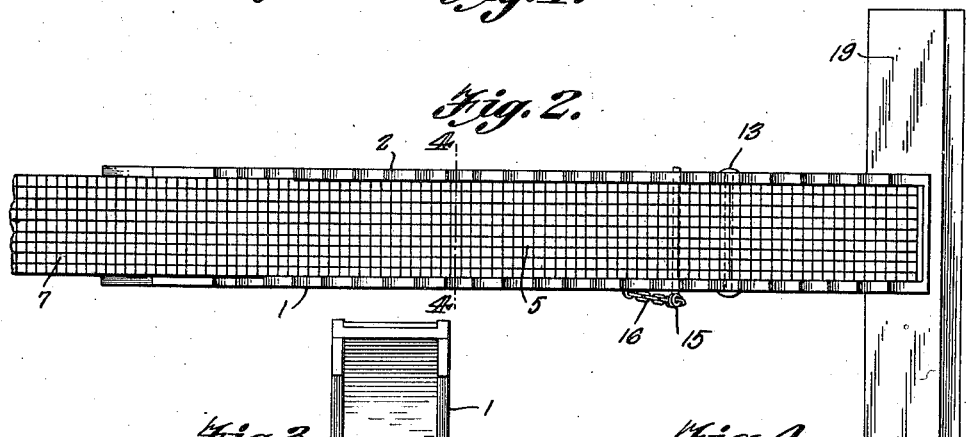
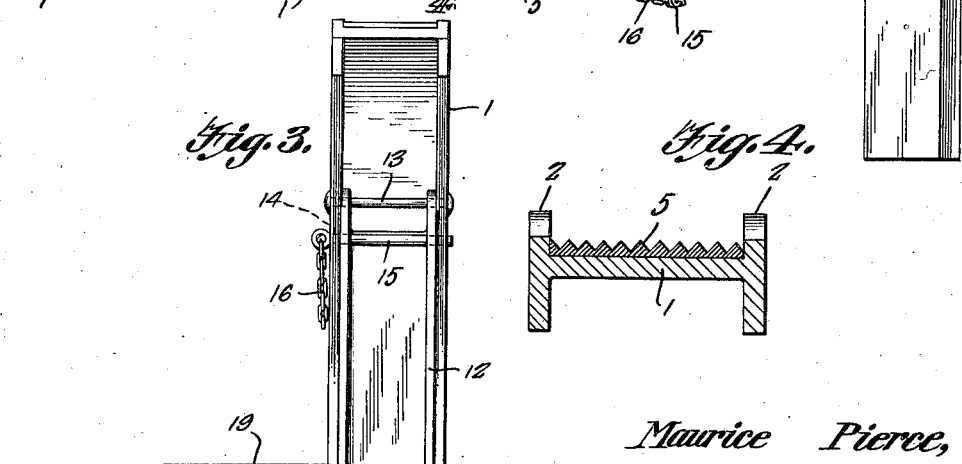
Maurice Pierce,
INVENTOR
BY Victor J. Evans
ATTORNEY
WITNESS:
P. J. Hickey.

Patented Nov. 22, 1927.

1,650,536

UNITED STATES PATENT OFFICE.

MAURICE PIERCE, OF BERGEN, NORWAY.

LIFTING JACK.

Application filed January 15, 1927. Serial No. 161,448.

My present invention has reference to a combination automatic lifting, advancing, transferring and lowering device for automobiles or like vehicles.

At the present time it is apparent that the only dependable and universally used device for the elevating of one vehicle wheel at a time is the lifting jack. I am aware that other successful devices involving the principle of leverage inclined planes et cetera, are in operation in garages, but these are too large and heavy to be carried under the automobile seat for use on the road.

It is needless to go into details in an attempt to describe the disadvantages and annoyances accompanying the employment of lifting jacks. Among them may, however, be mentioned the following:

1. The jack is usually dirty and greasy and soils the hands and clothes.
2. It must be held with both hands for proper placement until its operation has continued long enough to hold it firmly in an upright position. This is especially true on uneven ground. As a result it is necessary to stoop low when working or, in a large percentage of cases, to kneel or lie flat on the ground. This is particularly disagreeable in rain and mud.
3. Tender hands become sore and blistered from manipulation of jacks.
4. Operation on soft ground results in a loss of time and temper because the base of the jack often sinks into the ground as fast as the extension is accomplished with the movement of the lever.
5. There is a considerable loss of time both in elevating and lowering.

It is my object to provide a device which will obviate these disadvantages and inconveniences and to save time in a manner heretofore never before successfully accomplished.

The above and other objects I have accomplished in a manner which will be apparent upon perusal of the following specification and accompanying illustration.

In the drawings:

Figure 1 is a side elevation of the improvement in applied position.

Figure 2 is a top plan view thereof.

Figure 3 is a rear elevation thereof.

Figure 4 is a transverse sectional view approximately on the line 4—4 of Figure 2.

An inclined plane 1, is provided of any suitable substance such as light strong steel, aluminum, wood, or the like. The illustration shows a channeled steel member with the extended flanges on the upper side notched to provide scallops 2, or the same may be milled to make rough contact points with the rubber tire of an advancing automobile wheel to prevent slipping of said tire. At the base of the plane 1, the flanges are shown as completely cut-away on a level on line 3, permitting the central or middle portion of the plane to extend out and beyond the flanges to form, when bent, a horizontal approaching tongue or apron, 4, to the inclined plane proper.

Upon the upper inside surface of the plane, there is attached a strip of non-skidding material such as rough surfaced rubber, canvas, fiber, et cetera 5, by means such as mall rivets 6, and this attached non-skidding surface is allowed to extend out over the metal approaching apron 4 to form an additional horizontal clincher or approach 7, to the inclined upper surface of the plane with the object of holding the plane fast in position with reference to the ground until the weight of an advancing wheel is well transferred to the plane proper.

A non-skidding base 8, is provided preferably of vacuum cup rubber on its under or bottom surface and is attached to the plane by means, such as rivets 9, and with the assistance, if desired, of an angular shaped block support, 10, which may be inserted and attached by means of nails, screws or rivets 11.

The plane is held in its inclined position by a main fulcrum support 12, constructed preferably of strong light, rectangular shaped steel and attached permanently at a pivot or hinge point by means of a strong bolt 13, inserted through the flanges of the plane and the support near its upper end. Additional apertures 14, are provided through the under flanges of the plane and upper end of the support and a strong steel pin or bolt 15 is provided for insertion in apertures 14. The pin is attached and held fast from becoming lost by means of a cord 16 tied in a small aperture 17, in one of the under flanges of the plane.

The position of the pivot bolt 13, and the pin bolt 15 may be reversed if desirable, with the result that the fulcrum support would then swing into collapsing position in the opposite direction than that illustrated by the dotted lines (Fig. 1).

The main support 12 is attached to a channeled base 19 whose flanges are provided with sharpened edges 20. The main support 12 has its bottom notched, as at 18, and the base 19 is fastened with rivets 21, on its extending side of the support 12. The sharp edges are to hold fast on ice, snow, sand, mud and other semi-soft ground surfaces while the vacuum cupped base 8 is to hold fast on slippery cement, asphalt, and other hard ground surfaces. The base 19 is longer than the width of the main support 12 and is extended laterally therebeyond, in order to provide for a greater bearing surface in contact with the ground.

The support 12 after the pin 15 is removed from its aperture, will swing on the pivot 13 and fold up against the under side of the short end of the plane, thus enabling the device to be made quickly compact for storing under the seats of automobiles.

I consider the two different kinds of non-skidded bases 8 and 19 operating in collaboration and combination on a device of this kind, two of the most important features of my invention as well as being novel. The vacuum cup rubber is to hold tight on smooth, hard surfaces which may be very slippery, such as cement floors and asphalt pavements. The sharp points on the base of the support will hold fast on soft or semi-soft surfaces such as sand, mud, ice, snow, et cetera.

I may add that experiments have shown me the necessity of such efficient precautions to cover every circumstance and condition, and that the above have proven satisfactory under the severest tests.

Having described the invention, I claim:—

1. In a device for the purpose set forth, a channeled member having its side flanges cut away and its body portion extended angularly from said cut away portions at one end of the member, the body of the member and the said extension having a friction surface thereon, the upper edges of the flanges of the channeled member being scalloped, a channel support pivotally secured between the flanges of the first mentioned channeled member below the web thereof, swingable between said flanges and designed to have its end contact with the web of the said channel member when in supporting position, a pin flexibly supported from the channel member and insertible through the support and said channel member, and said support having a lateral base whose edges are sharpened.

2. In a device for the purpose set forth, a channeled member having its web projecting angularly from one end thereof to provide an apron whose outer end is beveled, a resilient friction plate on the web of the channel member extending over the apron and projecting therebeyond, a compressible base underlying the apron and the portion of the channel member adjacent thereto and secured to said opening, and a support pivotally secured to the depending flanges of the channel member adjacent to the second end thereof, swingable between said flanges when in inoperative position, and contactable with the web of the channel member when in supporting position, means for locking the support to the channel member when in the last mentioned position and, a laterally extending base for the support having impinging elements thereon.

3. In a device for the purpose set forth, a channel member having its side flanges at its upper edges scalloped, its web extending angularly from one end thereof and providing an apron whose outer edge is beveled, a compressible and removable friction plate in the channel member arranged over the apron and projecting therebeyond, a compressible base underlying the apron and the portion of the channel member adjacent thereto, said base having its under face depressed to provide vacuum cups, brace means between the rear end of the base and the channel member and a support pivotally secured between the depending flanges of the channel member and for contacting engagement with the said member when in supporting position and swingable between the said flanges of the channel member when in non-supporting position, and means for securing the support to the channel member when in supporting position.

4. A device for the purpose set forth, comprising a channel member having a friction surface on the web thereof, a compressible base having depressions forming vacuum cups at one end and extending angularly with respect to the channel member, a support pivotally secured between the depending flanges of the channel member and swingable between said flanges when in inactive position, said support having its outer end cut away from one to adjacent the second side thereof, and the last mentioned side having its end sharpened, and a laterally extending channeled base centrally secured to the said end of the support, and the said base having its outwardly extending flanges formed with chiseled edges.

In testimony whereof I affix my signature.

MAURICE PIERCE.